(12) United States Patent
Mumick et al.

(10) Patent No.: US 7,184,786 B2
(45) Date of Patent: Feb. 27, 2007

(54) TECHNIQUES FOR COMBINING VOICE WITH WIRELESS TEXT SHORT MESSAGE SERVICES

(75) Inventors: Inderpal Singh Mumick, Berkeley Heights, NJ (US); Ewald Anderl, Middletown, NJ (US); Raja Moorthy, Scotch Plains, NJ (US); Prasanna Uppaladadium, Scotch Plains, NJ (US)

(73) Assignee: Kirusa, Inc., New Providence, NJ (US)

( * ) Notice: Subject to any disclaimer, the term of this patent is extended or adjusted under 35 U.S.C. 154(b) by 0 days.

(21) Appl. No.: 11/019,754

(22) Filed: Dec. 21, 2004

(65) Prior Publication Data

US 2005/0136955 A1 Jun. 23, 2005

Related U.S. Application Data

(60) Provisional application No. 60/532,075, filed on Dec. 23, 2003.

(51) Int. Cl.
*H04Q 7/20* (2006.01)
*H04Q 7/22* (2006.01)
*H04L 12/58* (2006.01)

(52) U.S. Cl. .................. 455/466; 455/412.1; 455/412.2

(58) Field of Classification Search ............. 455/412.1, 455/412.2, 413, 414.1, 466, 403, 563, 414.4, 455/561

See application file for complete search history.

(56) References Cited

U.S. PATENT DOCUMENTS 6,385,461 B1* 5/2002 Raith .................... 455/518

| | | | |
|---|---|---|---|
| 2001/0049603 A1 | 12/2001 | Sravanapudi et al. | 704/270.1 |
| 2002/0086659 A1* | 7/2002 | Lauper | 455/404 |
| 2002/0146097 A1* | 10/2002 | Vuori | 379/88.22 |
| 2005/0187773 A1* | 8/2005 | Filoche et al. | 704/260 |
| 2005/0266831 A1* | 12/2005 | Roth | 455/412.1 |
| 2005/0266863 A1* | 12/2005 | Benco et al. | 455/466 |

FOREIGN PATENT DOCUMENTS

WO WO 03/055191 A1 * 3/2003

OTHER PUBLICATIONS

Kirusa Inc., "Kirusa Multimodal Solution for Circuit Voice (KMS-CV)," http://kirusa.com/products_kms_cv.php, undated, 1 page.
"Kirusa Sequential and SMS Multimodality," Kirusa, Inc., undated, 1 page.

* cited by examiner

*Primary Examiner*—Sonny Trinh
(74) *Attorney, Agent, or Firm*—Ash Tankha; Lipton Weinberger and Husick

(57) ABSTRACT

Combining speech with existing text wireless Short Message Service (SMS), to create a multimodal SMS service. A user of standard SMS text service is provided with a link within each message that allows adding or retrieval of a voice message associated with an SMS text message. A speech server in the wireless network may be used for recognition of voice commands, rendering of text into speech, and recording or playing back voice recordings. The messages may be retrieved or sent using any wireless handset. Additional services that may be used include message lists, prerecorded messages, integration with voicemail systems, image and video messages, cross-functional applications with Multimedia Messaging Services (MMS) and Enhanced Message Services (EMS), and extensions of the combination of voice with text SMS to other computing devices such as PDAs and PCs.

7 Claims, 2 Drawing Sheets

TECHNIQUES FOR COMBINING VOICE WITH WIRELESS TEXT SHORT MESSAGE SERVICES

CROSS-REFERENCE TO RELATED CASES

This application claims the benefit of U.S. Provisional Patent Application No. 60/532,075, entitled "Techniques for combining voice with wireless text short message services," filed on Dec. 23, 2003.

FIELD OF THE INVENTION

The present invention relates generally to sending and receiving of short messages between wireless telephony users, and, more specifically the addition of speech capabilities to standard text messaging systems creating a multimodal SMS service.

BACKGROUND OF THE INVENTION

In addition to the usual wireless telephony that cellular telephones provide, such devices are also widely used for sending short text messages (under the name Short Message Services or SMS) between wireless users.

More recently new devices and supporting network services are being introduced that allow more general class of messages to be sent between wireless devices, where the messages include voice, still images, and even moving images. Standards have been introduced for such services including Multimedia Message Services (MMS) and Enhanced Message Services (EMS).

However, as attractive as such new services are to users and wireless network providers, they require new and expensive wireless devices, of which few have been deployed to customers, as well as extensive additional network capabilities. Further, these new services do not inter-operate with existing SMS services in a seamless manner.

In view of the foregoing discussion there is a need for a system that can overcome the drawbacks of these new services and provide comparable advanced capabilities using only the inexpensive devices and networks currently available to support standard text SMS and that seamlessly inter-operate with SMS services.

Further, the disclosure herein is not limited to wireless phones but will also work with wireline phones with SMS capabilities and services over such wireline devices.

SUMMARY OF THE INVENTION

The present invention provides a Multimodal SMS mechanism (MultimodalSMS) combining speech, or other modalities (such as image or video data), with standard text SMS. This mechanism allows users to send and receive voice messages associated directly with text SMS messages. The mechanism can be applied using standard wireless telephone devices capable of sending and receiving SMS text messages and can be extended to many other device types, and network technologies.

A system according the invention preferably includes one or more of the following components: user input and/or output devices including those capable of playing and recording speech and those capable of entering and displaying text information; a speech recognition engine with an additional capability of recording voice; a text-to-speech engine for rendering text into spoken words; an application server for the MultimodalSMS service that uses the speech engines to combine speech with text messages created using one the input devices and sending such combined messages to a device that provides one or more of the output capabilities. The system also may include other network components such as a Short Message Service Center (SMSC) and a Multimodal Platform.

The text input device is used to compose a message to be sent using standard SMS technology. The MutlimodalSMS application combines the text message (if any) with a spoken message if desired by the user. The combined message is sent to recipient(s) who then can read the text message and retrieve, from the application server, the associated voice message. The speech recognition engine may be used for easy control of the playback and recording of voice messages as well as the control of other useful messaging function.

The SMSC provides a standard mechanism for transmitting SMS text messages and is also used to transmit or to insert the link into the text messages that allow connection to the speech server. The Multimodal Platform, which may be the Kirusa MultiModal Platform (KMMP), provides control and synchronization of modalities as needed. KMMP is presently provided by Kirusa, Inc., Edison, N.J., U.S.A. KMMP is described in "Kirusa Sequential and SMS Multimodality," and at http://kirusa.com/products_kms_cv.php.

Other features are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Figure 1:
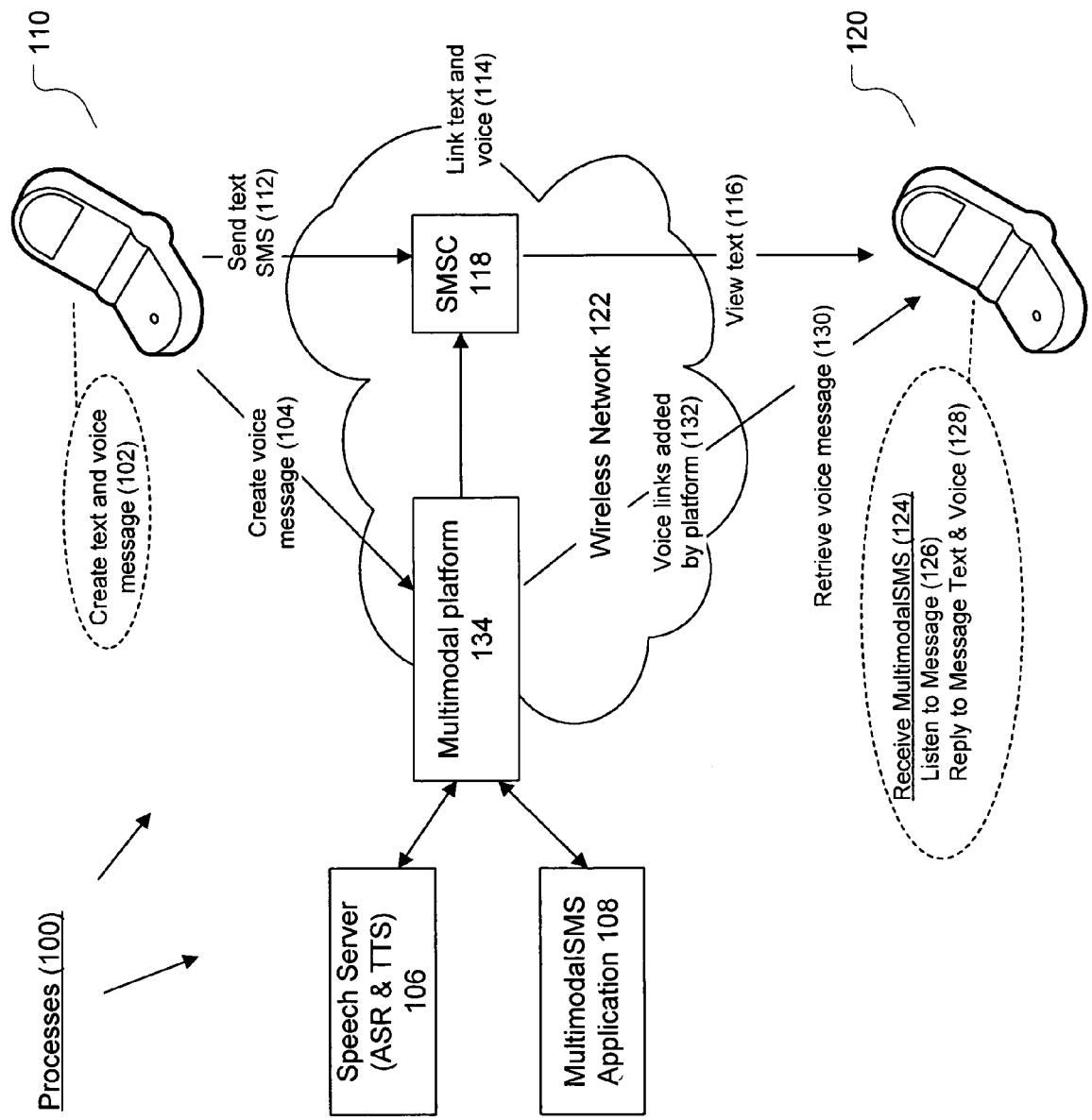
FIG. 1 is a flow and block diagram showing how a MultimodalSMS is created by a user device, transmitted through the network and received by a second user device.

FIG. 1 an overview of the process(es) 100 for creating, sending and receiving a MultimodalSMS message in accordance with the invention and shows one context in which a MultimodalSMS message may be used.

The following four application scenarios expand on what is outlined in FIG. 1.

An application scenario is a sequence of user actions, spanning a single or multiple modes. For example, a user may start the application in data mode and then switch to voice mode. Multiple application scenarios can be supported using a platform described herein. Switching between modes can be actuated via user and/or application control. And, most importantly, these scenarios can be supported from a single application code base and a single platform. In each of the following scenarios both Alice and Bob are wireless subscribers, and each operates a wireless telephone 110, 120, where the wireless telephones and other components are capable of communicating through a wireless network 122:

1. Alice sends a text SMS 112 to Bob and Bob replies with voice using a MultimodalSMS.
2. Alice receives 124 a MultimodalSMS from Bob, reads the text, and clicks the MultimodalSMS link to retrieve 130 and hear the voice portion of the message.
3. Bob connects to the MultimodalSMS application 108 and records a voice message for Alice. A MultimodalSMS is sent to Alice, containing a link 114 to the voice message left by Bob.
4. Alice calls in and chooses to listen to her SMS messages.

Scenario 1: In this scenario, Alice sends a text SMS message to Bob, which may be sent through the Short Message Service Center (SMSC) 118. Bob receives and views 116 the SMS message and chooses to respond with a MultimodalSMS message. Bob chooses to reply using voice, clicks on the MultimodalSMS link that is embedded in the SMS message, and records his voice message. The MultimodalSMS service also allows Bob to:

Listen to other MultimodalSMS messages
Delete the message or other Multimodal SMS messages
Forward this and other MultimodalSMS messages It should be noted that the link embedded in an SMS message can be created at the sending device, or by using the Multimodal Platform 134 to SMSC 118 link, or by using a modified SMSC 118. In a preferred embodiment, the Multimodal Platform 134 adds the links.

Scenario 2: For this scenario, Alice receives a text SMS notifying her that Bob has sent her a MultimodalSMS. Alice clicks on the link embedded in the SMS message to listen to the voice message. After she has heard the message, she has four options:

Reply to the message using voice in a MultimodalSMS message
Reply to the message with text
Delete the message
Forward the message as a MultimodalSMS message containing voice and any original text Scenario 3: In this example, Bob initiates a MultimodalSMS message to send to Alice. He connects to the MultimodalSMS application and speaks Alice's number, then records and sends his MultimodalSMS message (which may include, possibly, creating a voice message 104). Alice receives an SMS message with an embedded link which she can activate to listen 126 to the message.

Scenario 4: In this scenario, Alice wishes to listen to her text-based SMS messages. She is driving or unable to view her mobile screen. She calls a number and then is led through a series of voice prompts that enable her to access, select, and listen to the text, rendered by the Text-to-Speech (TTS) component of the Speech Server 106, (and any recorded speech) in the MultimodalSMS messages that she has received. Once again, she has four options:

Reply to the message with a MultimodalSMS message containing voice (128)
Reply to the message with text (128)
Delete the message
Forward the message as a MultimodalSMS message containing voice and any original text.

Figure 2:
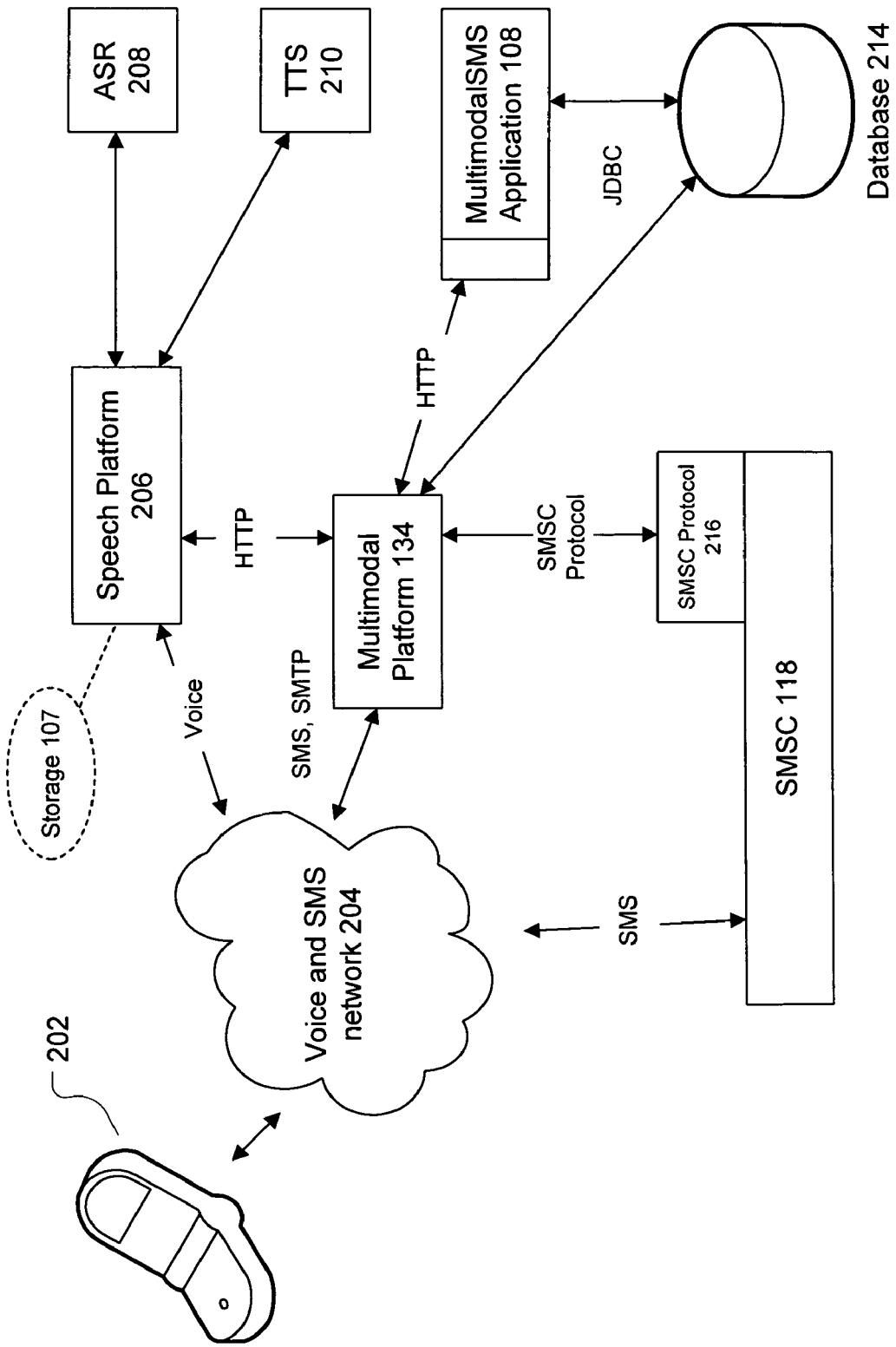
FIG. 2 is flow and block diagram of features of the invention deployed in a wireless telephone network. The MultimodalSMS application is shown in accordance with aspects of the invention. A Speech Platform and Multimodal Platform supporting the application within a wireless network illustrate the architecture of the invention.

FIG. 2 shows an example architecture in which illustrative components of the invention may be used and/or deployed. It is assumed that any conventional protocols mentioned in the drawing are known in the art, and thus detailed description of such is not provided herein.

An example process of creating a MultimodalSMS is as follows. To create a MultimodalSMS message the user of the telephone device 202 first creates any text message she wishes to send, including an empty message, and determines to whom the message is to be sent using whatever mechanisms are provided by the device 202. If she wishes to add speech to the SMS message, she clicks on a MultimodalSMS link in her phone book, or similar mechanism provided by the device, which connects her through the voice network 204 to the Multimodal Platform 134 (such as KMMP). Instructions are provided to allow her to record her voice message through the Speech Platform 206. The recorded voice message is then stored for future retrieval in database 214. The specific storage mechanism used may include a Media Server, a database or any other storage mechanism 107 that facilitates storing audio content. She then sends the SMS message which is transmitted through the SMS network 204 to the Short Message Service Center (SMSC) 118 which transmits the message to the recipient and also communicates a link within the message that allows the Multimodal Platform 134 to uniquely associate the SMS message and the stored voice message. (SMSC 118 may include, for example, an interface 216 that allows SMSC 118 to communicate with multimodal platform 134.) In a preferred embodiment, voice is sent as part of an SMS message by including within the SMS message a link to retrieve the voice message from another location (e.g., the SMS message may contain a link to the Multimodal Platform 134 which, when accessed, causes the voice message to be retrieved from the Speech Platform 206 (or from a media server or database); alternatively, the link may be to any other location, wherein the user is led through any series of events to obtain the voice message).

When the message is received by the user at the other end of the connection there is a telephony link embedded in the message that, using whatever method is available on the recipients' device, once accessed, connects the recipient to the Multimodal Platform 134 which retrieves the voice message from the Speech Server (or from a media server or database) and plays it to the recipient.

At that point the recipient has a number of options provided by the MultimodalSMS Application 108. These may include a voice reply, a text SMS reply or deletion of the message stored on the server.

In other illustrative embodiments of the invention more complex scenarios are possible.

The MultimodalSMS application may provide a user with the capability of storing, editing and applying lists of recipients so that a message can be distributed to a number of recipients. These lists would be stored in the application Database 214. Such lists could be entered by conventional means or could be uploaded to the network. Once stored the lists could be used for addressing MultimodalSMS or even standard text SMS messages.

Instead of composing the text SMS message in advance, the invention also envisions addition of text material to a voice message while a voice connection is active to the Speech Server. This would preferably be done using a Unstructured Supplementary Services Data (USSD) channel which is a standard low-bit-rate channel that can be active, if enabled by the network provider, simultaneously with a voice connection. (This can also be accomplished by using SMS technology to directly send an SMS.) Those skilled in the art will also realize that other mechanisms inherent in current devices and networks can be used to simultaneously encode and send the small text messages required, while a voice connection is active.

A further exemplary capability is the storage of preset or standard messages ("canned" messages) that could be stored in the database and maintained using a web or Wireless Application Protocol (WAP) interface. Once stored these messages would be accessible using the voice interface already provided as part of MultimodalSMS.

If contacts are stored in the device, rather than in the network, they can also be used in addressing a MultimodalSMS message. They could be accessed as part of the Multimodal application, by using an application on the device or through the use of USSD as previously described. If a buddy list, used with a Push-to-talk (PTT) capable device, is available that list can be used for sending a MultimodalSMS and it also can be used for sending a voice message to a buddy who is off-line using the PTT capability. The resulting message can also be retrieved using PTT.

Any message, or text portion of a message, sent via standard SMS mechanisms can, as part of the invention described herein, be intercepted and converted, using the TTS component 210 of the Speech Server, to a MultimodalSMS for forwarding to the recipient.

If one of the users (e.g., the sender of the message) has access to a device that supports MMS or EMS capability the invention allows the speech component of an enhanced message to be removed from the message, stored in the Speech Server (or media server or database) and delivered as a MultimodalSMS message to a recipient even if the recipient has a device only supporting SMS text capability.

The Multimodal Platform 134 component, controlled by the MultimodalSMS application 108, also allows MultimodalSMS message creation and retrieval by other means and with other than standard wireless telephones. Any device that supports either Simultaneous or Sequential Multimodal applications, or Web applications, can be used. These include Personal Digital Assistants (PDA), Pocket PCs, laptop and desktop PCs as well as any wireless or wireline telephones supporting such applications. As an illustrative example, a PDA that supports simultaneous multimodal applications could be used to enter text via a keyboard while recording the voice portion of the message simultaneously. Complex control option can be displayed on the PDA screen and selected using a stylus. Having access to such devices, or to MMS or EMS devices, an additional inventive idea allows creation and display of video data, which can also be stored in the MultimodalSMS database and controlled through the MultimodalSMS application 108.

If the user has a WAP capable phone, the invention can be used to provide image extensions to text SMS by storing these in the MultimodalSMS database and providing them, through the MultimodalSMS application and the Multimodal Platform for display on the WAP browser in the phone.

In general, since the data, voice or image, associated with the MultimodalSMS message is stored in the MultimodalSMS database it can be directed to other media. Such media illustratively includes print media. The MultimodalSMS can be printed on a Kiosk or home computer printer. The voice portion of a MultimodalSMS can be directed for retrieval to any standard Voicemail system, such as those provided for network storage of voice messages, or directed to any telephone for listening or possible storage on local Voicemail. In further illustration, in addition to direct printing of image data portion, the voice portion can be converted to text using the ASR ("Automatic Speech Recognition") element 208 of the Speech Server and similarly directed to a standard printer.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of multi-modal communication comprising:
generating an SMS message, wherein the underlying content that is to be represented in the form of an SMS message comprises at least one of:
text; and
audio;
sending the SMS message to a recipient; and
the recipient opening the SMS message on a device that supports the rendering of both said text and said audio to retrieve the content of the SMS message, wherein at least one of the following holds:
the underlying content represented in the form of the SMS message comprises said audio, and wherein the SMS message comprises a link to listen to said audio;
the underlying content represented in the form of the SMS message comprises said text and said audio, and wherein the SMS message comprises said text and a link to listen to said audio; and
the underlying content represented in the form of the SMS message comprises said text and the recipient takes an action to have the text synthesized as audio,
wherein:
the underlying content represented in the form of the SMS message comprises said audio, and wherein the SMS message comprises a link to listen to said audio,
wherein said link refers to a first platform that is enabled to identify, and cause to be retrieved, a stored form of said audio based on information contained in the link or based on identity of the SMS message,
wherein the first platform causes a second platform on which said audio is stored to be retrieved and synthesized,
and wherein the second platform transmits said audio to a telephone set operated by said recipient without said audio passing through said first platform.

2. The method of claim 1, wherein said telephone set comprises a wireless telephone set.

3. A computer-readable medium having computer-executable instructions to perform a method of participating in sending an SMS message, the method comprising:
receiving first data indicative of a text message having been composed at a first wireless telephone, said first text message comprising text;
receiving second data indicative of an audio message to be associated with said text message having been composed at said first wireless telephone; and
creating an SMS message that comprises said text and a link which is activatable to retrieve said audio message, said link being activatable by a recipient of said SMS message at a second wireless telephone associated with said recipient.

4. The computer-readable medium of claim 3, wherein said first data comprises a text message that comprises said text and that is received from said first wireless telephone.

5. The computer-readable medium of claim 3, wherein the method further comprises:
  receiving an indication that a user has selected one of a plurality of pre-recorded audio messages to be included in said SMS message;
  including in said SMS message a link to the selected pre-recorded audio message, wherein the pre-recorded audio message to be included in the SMS message is selectable by the user but wherein the plurality of audio messages are not modifiable by the user.

6. The computer-readable medium of claim 3, wherein said receiving acts are performed at a multi-modal platform, and wherein said audio message retrievable by way of said link is stored at a speech server or a media server or a database distinct from said multi-modal platform.

7. The computer-readable medium of claim 3, further comprising:
  receiving an indication that an MMS or EMS message has been created at said first wireless telephone,
and wherein said creating act comprises:
  retrieving an audio portion of said MMS or EMS message;
  storing said audio portion; and
  including in said SMS message a link that is activatable by said recipient at said second wireless telephone to retrieve the stored audio portion.

* * * * *